(12) United States Patent
Dharmaraj et al.

(10) Patent No.: US 9,908,644 B2
(45) Date of Patent: Mar. 6, 2018

(54) GRAVITY CHAMBER THAT ROTATES ON SUPPORT BEARINGS MOUNTED ON AN INNER SURFACE OF A HULL OF A HABITATION MODULE

(71) Applicant: The Boeing Company, Chicago, IL (US)

(72) Inventors: Raju Dharmaraj, League City, TX (US); Patrick A. Swartzell, Pearland, TX (US); James Michael Engle, Pearland, TX (US); Karl David Heiman, Houston, TX (US)

(73) Assignee: The Boeing Company, Chicago, IL (US)

( * ) Notice: Subject to any disclaimer, the term of this patent is extended or adjusted under 35 U.S.C. 154(b) by 209 days.

(21) Appl. No.: 14/992,967

(22) Filed: Jan. 11, 2016

(65) Prior Publication Data

US 2017/0197737 A1 Jul. 13, 2017

(51) Int. Cl.
*B64G 1/60* (2006.01)
*B64G 1/46* (2006.01)

(52) U.S. Cl.
CPC ....... *B64G 1/60* (2013.01); *B64G 1/46* (2013.01)

(58) Field of Classification Search
CPC ............... B64G 1/12; B64G 1/46; B64G 1/60
See application file for complete search history.

(56) References Cited

U.S. PATENT DOCUMENTS

| 4,643,375 | A  | * | 2/1987  | Allen     | B64G 1/60 244/171.9 |
| 6,216,984 | B1 | * | 4/2001  | Brinsmade | B64G 1/12 244/159.4 |
| 6,523,782 | B2 | * | 2/2003  | Barutt    | B64G 1/12 244/171.9 |
| 9,090,361 | B2 | * | 7/2015  | Clay      | B64G 1/14 |
| 9,359,091 | B2 | * | 6/2016  | Biddlecom | B64G 1/46 |
| 9,776,743 | B2 | * | 10/2017 | Dharmaraj | B64G 1/46 |
| 2014/0124626 | A1 | * | 5/2014 | Clay      | B64G 1/14 244/159.3 |
| 2014/0124627 | A1 | * | 5/2014 | Clay      | B64G 1/14 244/159.3 |
| 2017/0197734 | A1 | * | 7/2017 | Dharmaraj | B64G 1/12 |
| 2017/0197735 | A1 | * | 7/2017 | Dharmaraj | B64G 1/46 |
| 2017/0197736 | A1 | * | 7/2017 | Dharmaraj | B64G 1/60 |
| 2017/0197738 | A1 | * | 7/2017 | Dharmaraj | B64G 1/60 |
| 2017/0240302 | A1 | * | 8/2017 | Dharmaraj | B64G 1/60 |
| 2017/0240303 | A1 | * | 8/2017 | Dharmaraj | B64G 1/60 |

* cited by examiner

*Primary Examiner* — Philip J Bonzell
*Assistant Examiner* — Michael B Kreiner
(74) *Attorney, Agent, or Firm* — Duft Bornsen & Fettig LLP

(57) ABSTRACT

A habitation module with a gravity chamber that provides an artificial gravity environment. In one embodiment, the gravity chamber includes an outer cylindrical wall and opposing side walls. The gravity chamber attaches to a hull of the habitation module with support bearings. The support bearing includes an outer race attached to an inner surface of the hull, and an inner race attached to the gravity chamber. A drive mechanism drives the inner race of the support bearing to rotate the gravity chamber about an axis to simulate a gravitational force within the gravity chamber.

22 Claims, 11 Drawing Sheets

GRAVITY CHAMBER THAT ROTATES ON SUPPORT BEARINGS MOUNTED ON AN INNER SURFACE OF A HULL OF A HABITATION MODULE

FIELD

This disclosure relates to the field of habitation modules that provide artificial gravity environments.

BACKGROUND

When humans occupy a space station, they encounter a zero-gravity environment or "weightless" environment. Extended exposure to a zero-gravity environment can be detrimental to the health of the human occupants, such as muscle and bone degeneration. To avoid these long-term health effects, artificial gravity environments may be installed in the space station. One way to create artificial gravity is with centrifugal force, where a vessel rotates at a speed that drives a human occupant inside of the vessel toward the outer hull of the vessel. The force on the human occupant feels like a gravitational pull.

Because of the health benefits and comfort of artificial gravity, it is desirable to design improved artificial gravity environments for space habitats/vehicles.

SUMMARY

Embodiments described herein include a habitation module for a space station or the like that includes a gravity chamber for human occupancy. The gravity chamber is cylindrical with an outer cylindrical wall and opposing side walls. The gravity chamber attaches to an inner surface of the hull of the habitation module via support bearings. Each support bearing includes an outer race attached to the hull, and an inner race attached to the gravity chamber. A drive mechanism rotates the gravity chamber on the support bearings about an axis to simulate a gravitational force within the gravity chamber. Artificial gravity is therefore created within the gravity chamber.

In one embodiment, the drive mechanism directly drives one or both of the support bearings. For instance, the inner race of a support bearing may include teeth that mesh with a drive gear of the drive mechanism. Therefore, the drive mechanism is able to directly drive the gravity chamber (i.e., rotate the gravity chamber about the axis) without direct contact with a wall of the gravity chamber. Thus, the drive mechanism will create very little noise within the gravity chamber.

A gravity chamber as described herein may be used as a walking, jogging, or running track, where crew members are able to exercise in an artificial gravity environment. An exercise track with artificial gravity is an improvement over treadmills and the like that are presently used in zero-gravity environments. Also, exercise in artificial gravity as compared to zero-gravity provides health benefits for the crew members, such as reduced muscle and bone degeneration.

A gravity chamber may be used for or reconfigured into resting areas, such as a restroom, bedroom, office, etc. Using a gravity chamber in this manner has benefits for the crew members, such as sleeping in a horizontal position, sitting in normal postures for work, etc.

One embodiment comprises a habitation module comprising a hull that defines an outer diameter of the habitation module. The habitation module further includes a gravity chamber that includes an outer cylindrical wall and opposing side walls that connect to the outer cylindrical wall. The habitation module further includes first support bearings for attaching the gravity chamber to the hull of the habitation module, wherein each of the first support bearings includes an outer race attached to an inner surface of the hull, and an inner race attached to the gravity chamber. The habitation module further includes a first drive mechanism that drives the inner race of at least one of the first support bearings to rotate the gravity chamber in a first direction about an axis to simulate a gravitational force within the gravity chamber.

In another embodiment, the first support bearings comprise a pair of support bearings spaced axially along the inner surface of the hull, and attached to opposing sides of the gravity chamber.

In another embodiment, the habitation module further includes a cylindrical counter-weight member that rotates about the axis in an opposite direction than the gravity chamber.

In another embodiment, the cylindrical counter-weight member comprises a counter-weight and second support bearings for attaching the counter-weight to the hull. Each of the second support bearings includes an outer race attached to the inner surface of the hull, and an inner race attached to the counter-weight.

In another embodiment, the habitation module further includes a second drive mechanism that drives the inner race of at least one of the second support bearings to rotate the counter-weight in a second direction about the axis that is opposite than the first direction.

In another embodiment, a first one of the first support bearings includes teeth on the inner race. The first drive mechanism includes a drive gear having teeth that mesh with the teeth on the inner race of the first one of the first support bearings. The first drive mechanism is configured to spin the drive gear to impart rotational movement to the inner race of the first one of the first support bearings.

In another embodiment, the gravity chamber is hollow between the outer cylindrical wall and the side walls, and an inner surface of the outer cylindrical wall is lined with a material for an exercise track.

In another embodiment, the gravity chamber includes an inner cylindrical wall, where the side walls extend between the inner cylindrical wall and the outer cylindrical wall. The gravity chamber includes a plurality of partitions that extend radially from the inner cylindrical wall to the outer cylindrical wall to define compartments within the gravity chamber. The compartments may be for a restroom facility, a sleeping facility, etc.

In another embodiment, the gravity chamber includes an inner cylindrical wall, where the side walls extend between the inner cylindrical wall and the outer cylindrical wall. The gravity chamber includes a divider orthogonal to the axis that divides the gravity chamber into a first annular sub-chamber and a second annular sub-chamber. The first annular sub-chamber is hollow between the inner cylindrical wall, the outer cylindrical wall, and the side walls for an exercise track. The second annular sub-chamber includes a plurality of partitions that extend radially from the inner cylindrical wall to the outer cylindrical wall between the side walls to define compartments within the second annular sub-chamber.

In another embodiment, the side walls include support members that connect to the outer cylindrical wall and provide rigidity to the side walls. The support members include spring dampeners.

Another embodiment comprises a habitation module that includes a hull that defines an outer diameter of the habitation module. The habitation module further includes a first gravity chamber that includes a first outer cylindrical wall and first opposing side walls, and a second gravity chamber that includes a second outer cylindrical wall and second opposing side walls. The habitation module further includes first support bearings for attaching the first gravity chamber to the hull of the habitation module. Each of the first support bearings includes a first outer race attached to an inner surface of the hull, and a first inner race attached to the first gravity chamber. The habitation module further includes second support bearings for attaching the second gravity chamber to the hull. Each of the second support bearings includes a second outer race attached to the inner surface of the hull, and a second inner race attached to the second gravity chamber. The habitation module further includes at least one drive mechanism that rotates the first gravity chamber on the first support bearings in a first direction about an axis, and rotates the second gravity chamber on the second support bearings in a second direction about the axis that is opposite than the first direction.

Another embodiment comprises a habitation module having a hull that defines an outer diameter of the habitation module. The habitation module further includes an annular gravity chamber that includes an outer cylindrical wall, an inner cylindrical wall, and opposing side walls that connect the outer cylindrical wall and the inner cylindrical wall. The habitation module further includes first support bearings for attaching the gravity chamber to the hull. Each of the first support bearings includes a first outer race attached to an inner surface of the hull, and a first inner race attached to the gravity chamber. The habitation module further includes a first drive mechanism that drives the first inner race of at least one of the first support bearings to rotate the gravity chamber in a first direction about an axis to simulate a gravitational force within the gravity chamber. The habitation module further includes a counter-weight and second support bearings for attaching the counter-weight to the hull. Each of the second support bearings includes a second outer race attached to the inner surface of the hull, and a second inner race attached to the counter-weight. The habitation module further includes a second drive mechanism that drives the second inner race of at least one of the second support bearings to rotate the counter-weight in a second direction about the axis that is opposite than the first direction.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
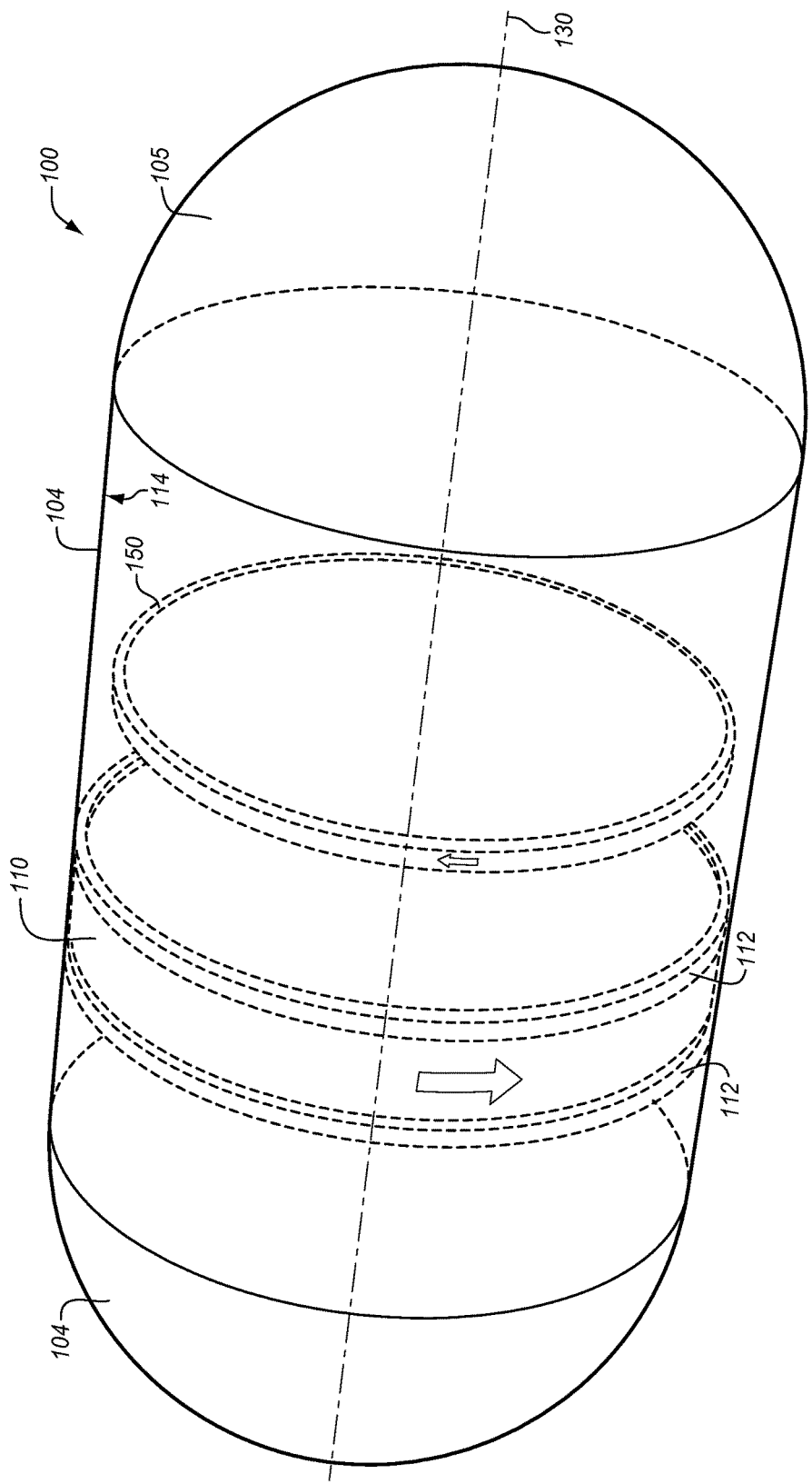
FIG. 1 illustrates a habitation module in an exemplary embodiment.

FIG. 1 illustrates a habitation module 100 in an exemplary embodiment. Habitation module (HAB) 100 is a module used for living quarters for crew members of a space station, such as the International Space Station. For example, HAB 100 may be used for sleeping quarters, restroom facilities, medical facilities, exercise facilities, etc. HAB 100 is configured for space vehicles in Low-Earth Orbit (LEO) or Beyond Low-Earth Orbit (BLEO).

HAB 100 is illustrated as a cylindrical capsule with a hull 102 that encapsulates the modules and systems of HAB 100. Hull 102 is the rigid outer body or fuselage of HAB 100 that defines its outer diameter, which may be about 8.4 meters. The outer diameter of HAB 100 may be limited by the size of the launch vehicle used to transport HAB 100 into space. For example, a Space Launch System (SLS) from NASA may be used to transport HAB 100 into space, and the outer diameter of HAB 100 may be constrained by the size of the SLS. Although not shown in FIG. 1, at least a portion of the interior of hull 102 may be pressurized and supplied with oxygen. Either (or both) of the ends 104-105 of hull 102 may be attached to other modules of a space station.

In order to provide an artificial gravity environment for the crew members, HAB 100 is equipped with one or more gravity chambers 110 that rotate about an axis 130. Gravity chamber 110 rotates at a speed to create an artificial gravity environment by simulating gravitational forces. For example, gravity chamber 110 may rotate at 8 rpm, 10 rpm, 12 rpm, etc., to create an artificial gravity environment. Gravity chamber 110 attaches to an inner (or interior) surface 114 of hull 102 by attachment members 112, which allow gravity chamber 110 to rotate in relation to hull 102. As will be described in more detail below, HAB 100 may further include a counter-weight member 150 that rotates in the opposite direction as gravity chamber 110.

Figure 2:
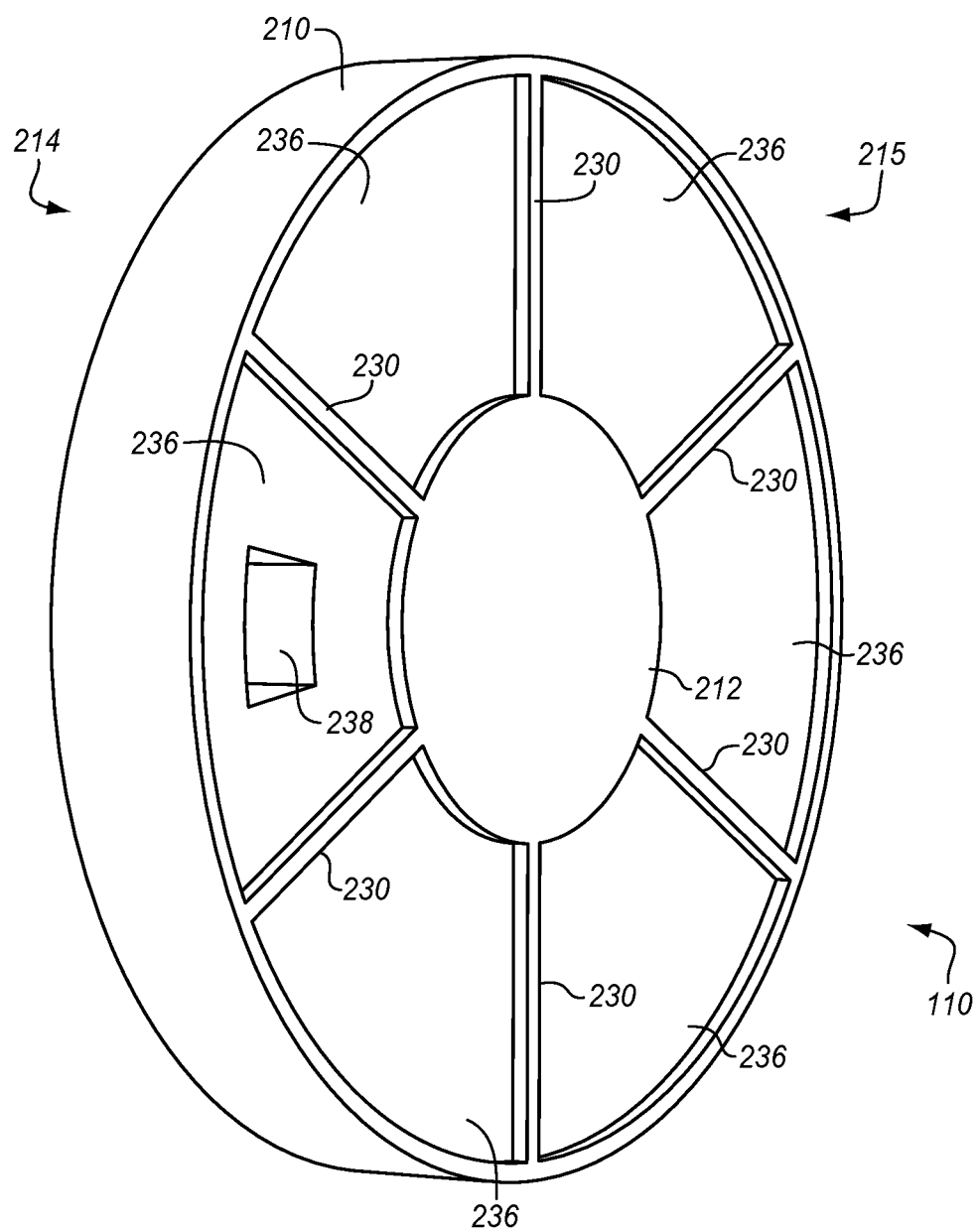
FIG. 2 illustrates a gravity chamber of a habitation module in an exemplary embodiment.

FIG. 2 illustrates gravity chamber 110 of HAB 100 in an exemplary embodiment. Gravity chamber 110 may be annular or ring-shaped as shown in FIG. 2, with an outer cylindrical wall 210 that defines the outer diameter of gravity chamber 110, an inner cylindrical wall 212 that defines an inner diameter of gravity chamber 110, and opposing side walls 214-215. Outer cylindrical wall 210 is the outermost cylindrical surface of gravity chamber 110. Outer cylindrical wall 210 may be made from a thin metal, a composite material, a plastic, or another type of rigid material. Inner cylindrical wall 212 may represent the innermost cylindrical surface of gravity chamber 110. Inner cylindrical wall 212 may be made from a material, such as a thin metal, a composite material, a plastic, or another type of rigid material, or may be made from a soft material, such as Kevlar®, canvas, or another type of fabric.

Side walls 214-215 may act to enclose the space between the outer and inner walls 210, 212. Side walls 214-215 may each include a plurality of support members 230 that extend between outer cylindrical wall 210 and inner cylindrical wall 212. Support members 230 provide a rigid frame for side walls 214-215. Support members 230 may be made from aluminum, a composite material, or another type of material. For example, support members 230 may comprise 1 inch aluminum tubes with 0.049 inch walls. Support members 230 may extend radially from inner cylindrical wall 212 to outer cylindrical wall 210 as illustrated in FIG. 2, or may be angled in relation to the radial direction if desired. The number and placement of support members 230 is just an example, and may vary as desired. Side walls 214-215 may also include side closures 236 that enclose the area between support members 230. Side closures 236 may be made from a soft material, such as Kevlar®, canvas, or another type of fabric. One or more entry openings 238 may be formed in side closures 236 to allow crew members to access the inside of gravity chamber 110. Entry openings 238 have a size large enough for a crew member to pass through, and may include a door and a mechanism for opening and closing the door, such as a latch, a zipper, etc.

The structure of gravity chamber 110 in FIG. 2 is just an example. In other embodiments, gravity chamber 110 may include outer cylindrical wall 210 and side walls 214-215 (with no inner cylindrical wall 212).

Figure 3A:
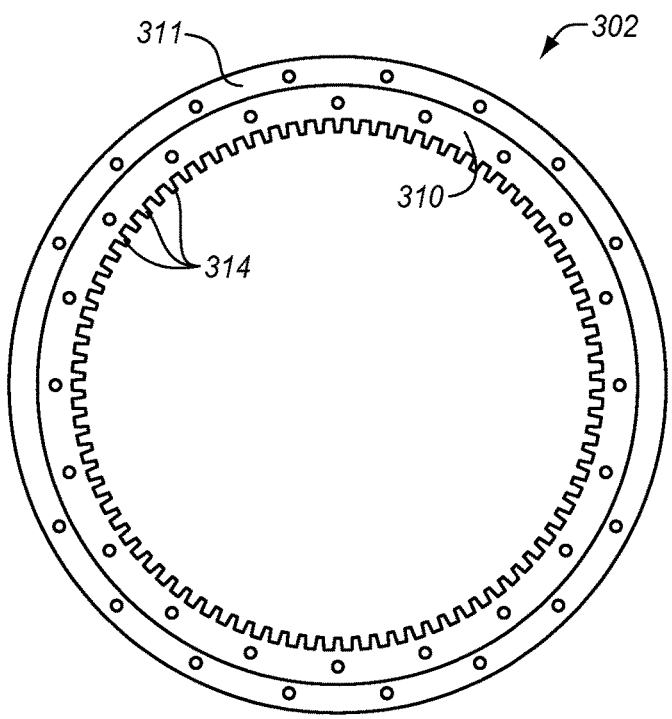
FIGS. 3A-3B illustrate support bearings in an exemplary embodiment.
Figure 3B:
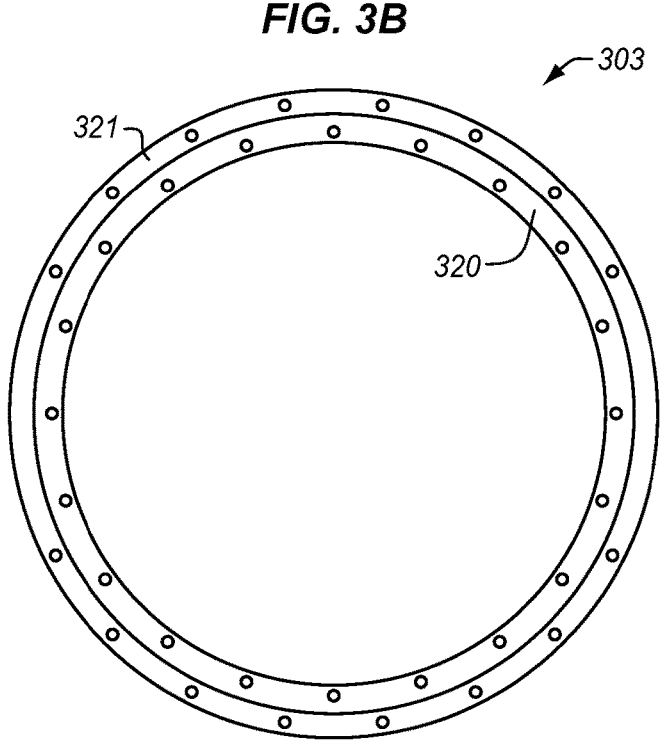

Gravity chamber 110 attaches to inner surface 114 of hull 102 with attachment members 112, which may comprise support bearings. FIGS. 3A-3B illustrate support bearings 302-303 for gravity chamber 110 in an exemplary embodiment. Support bearings 302-303 are configured to attach gravity chamber 110 to hull 102 so that gravity chamber 110 is able to rotate in relation to hull 102 about axis 130. Support bearing 302 includes an inner race (or ring) 310, an outer race (or ring) 311, and a rolling element between inner race 310 and outer race 311 that enables rotational movement (not visible in FIG. 3A). The rolling element may comprise ball bearings, cylindrical rollers, or the like. Outer race 311 is configured to attach to hull 102, while inner race 310 is configured to attach to gravity chamber 110. Support bearing 302 also includes a plurality of teeth 314 on inner race 310 for meshing with a drive gear of a drive mechanism. Support bearing 303 (see FIG. 3B) has a similar structure as support bearing 302 with an inner race 320 and an outer race 321, except that its inner race 320 does not include teeth.

Figure 4:
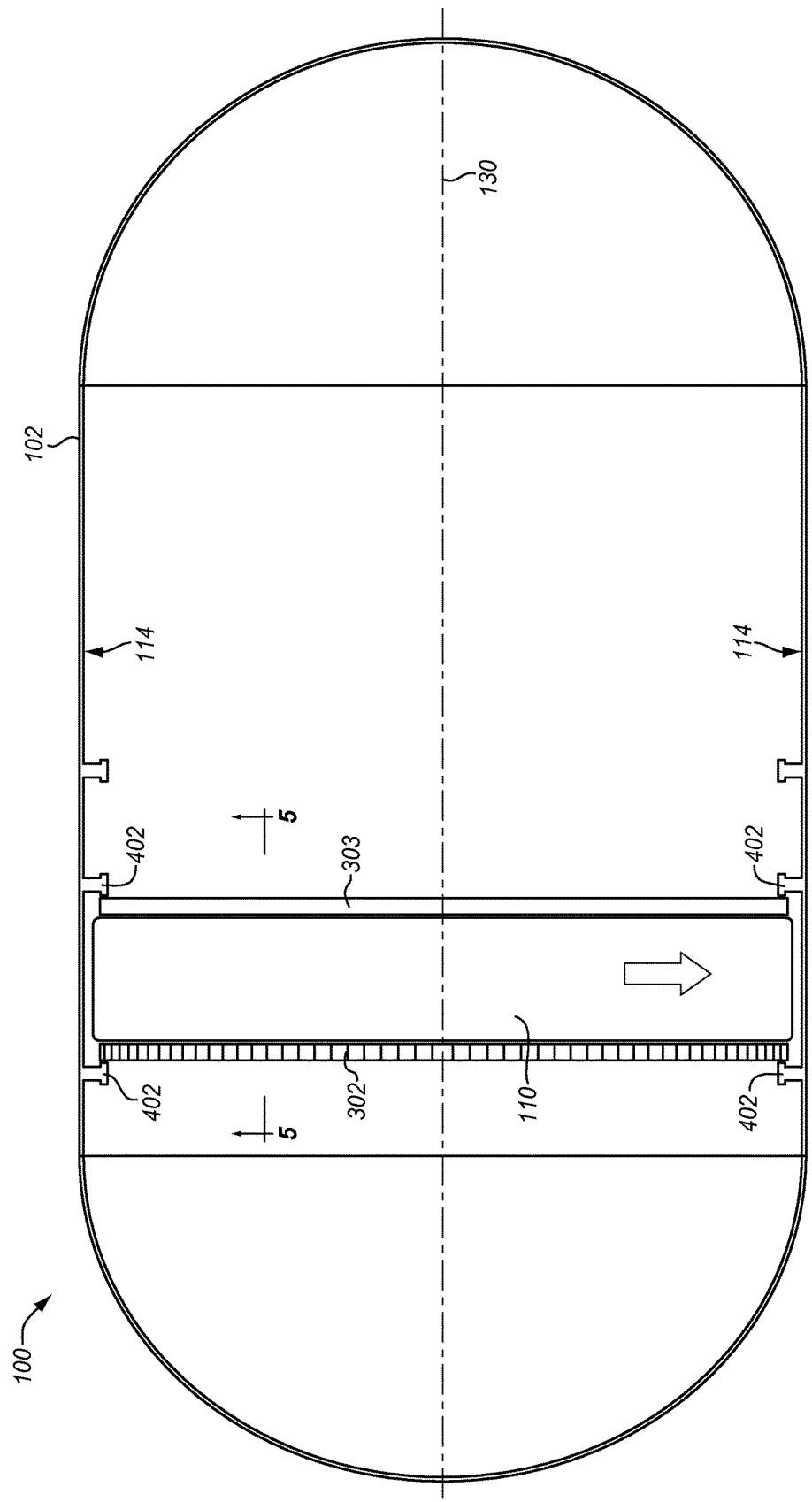
FIG. 4 illustrates a gravity chamber attached to a hull of a habitation module with support bearings in an exemplary embodiment.

FIG. 4 illustrates gravity chamber 110 attached to hull 102 with support bearings 302-303 in an exemplary embodiment. Support bearings 302-303 are spaced axially along and attach to hull 102. The use and placement of support bearings 302-303 as shown in FIG. 4 is just an example and may vary as desired. For example, two support bearings 302 with teeth 314 may be used in one application. In another example, more than two support bearings 302-303 may be used.

Hull 102 includes mounting members 402 that protrude from inner surface 114 of hull 102. Mounting members 402 may comprise a ring that extends around the inner surface 114 of hull 102, or may comprise a plurality of individual members that are affixed around the inner surface 114 of hull 102. Support bearings 302-303 attach to mounting members 402, and also attach to gravity chamber 110.

Figure 5:
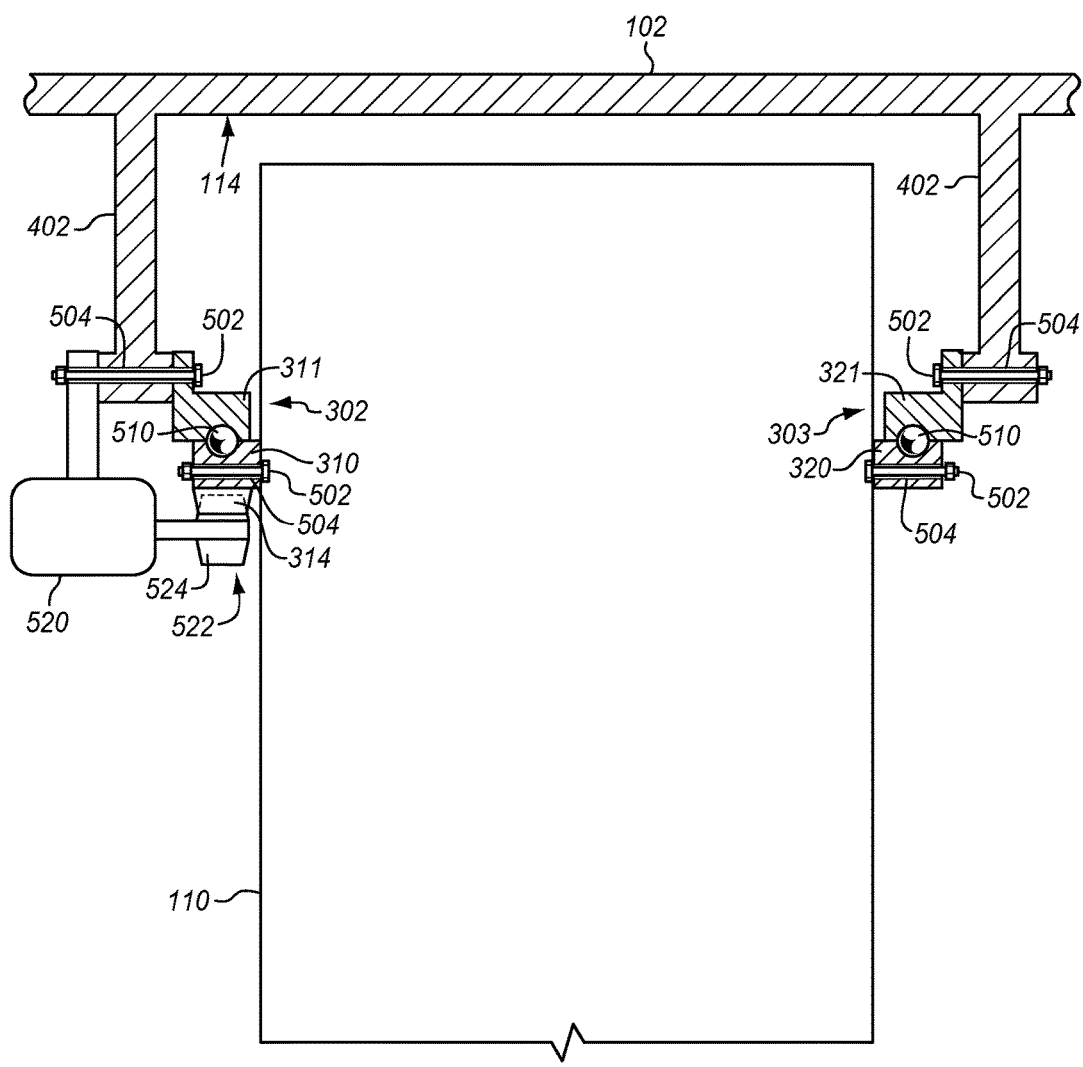
FIG. 5 illustrates attachment of a gravity chamber to a hull of a habitation module in an exemplary embodiment.

FIG. 5 illustrates attachment of gravity chamber 110 to hull 102 in an exemplary embodiment. FIG. 5 is a cross-section along line 5-5 of FIG. 4 showing attachment points of support bearings 302-303 to gravity chamber 110 (only a portion of gravity chamber 110 is shown in FIG. 5). On the left-hand side of gravity chamber 110, inner race 310 of support bearing 302 attaches to gravity chamber 110 with an attachment member 502, such as a bolt, screw, pin, etc. Inner race 310 may attach to outer cylindrical wall 212 or a side wall 214-215 of gravity chamber 110. Outer race 311 of support bearing 302 attaches to mounting member 402 with an attachment member 502. Bushings 504 (e.g., rubber bushings) may be used at the attachment point for outer race 311 and inner race 310 to absorb noise and/or vibration at the attachment point. Also shown in FIG. 5 is a rolling element 510 between inner race 310 and outer race 311 that enables rotational movement. Rolling element 510 may comprise ball bearings, cylindrical rollers, or the like.

A drive mechanism 520 is placed proximate or adjacent to inner race 310 of support bearing 302 to directly drive support bearing 302. Drive mechanism 520 is configured to spin a drive gear 522 to impart rotational movement to inner race 310. Teeth 524 on drive gear 522 mesh with teeth 314 on inner race 310 (see FIG. 3). When drive mechanism 520 turns drive gear 522, it imparts rotational movement on gravity chamber 110 about axis 130 (see FIG. 1). Drive mechanism 520 may comprise an electric motor, a hydraulic motor, a pneumatic motor, or any other actuating device that has a variable rotational speed.

On the right-hand side of gravity chamber 110, inner race 320 of support bearing 303 attaches to gravity chamber 110 with an attachment member 502. Outer race 321 of support bearing 303 attaches to mounting member 402 with an attachment member 502. Bushings 504 may be used at the attachment point for outer race 321 and inner race 320 to absorb noise and/or vibration at the attachment point.

As shown in FIG. 5, support bearing 302 (with teeth 314) is installed on one side of gravity chamber 110, and support bearing 303 (without teeth 314) is installed on the other side of gravity chamber 110. In another embodiment, support bearing 302 (with teeth 314) may be installed on either side or both sides of gravity chamber 110. If support bearing 302 is installed on both sides, a drive mechanism will be installed on both sides of gravity chamber 110 to drive the inner race 310 of support bearing 302 from each side of gravity chamber 110.

The rotation of gravity chamber 110 about axis 130 creates a centrifugal force on objects (e.g., crew members) inside of gravity chamber 110 that pulls the objects towards outer cylindrical wall 210. The centrifugal force feels like gravity to a crew member inside of gravity chamber 110. Because gravity chamber 110 is attached to hull 102 through support bearings 302-303, gravity chamber 110 will rotate very smoothly. Also, drive mechanism 520 drives support bearing 302 and does not directly contact the walls of gravity chamber 110, which results in minimal noise from drive mechanism 520.

The rotation of gravity chamber 110 may also create an unwanted momentum for HAB 100. To cancel out the unwanted momentum, cylindrical counter-weight member 150 (see FIG. 1) may be installed on hull 102 to rotate about axis 130 in an opposite direction than gravity chamber 110. The structure of counter-weight member 150 may vary as desired. In one embodiment, a counter-weight may be installed on support bearings as described below.

Figure 6:
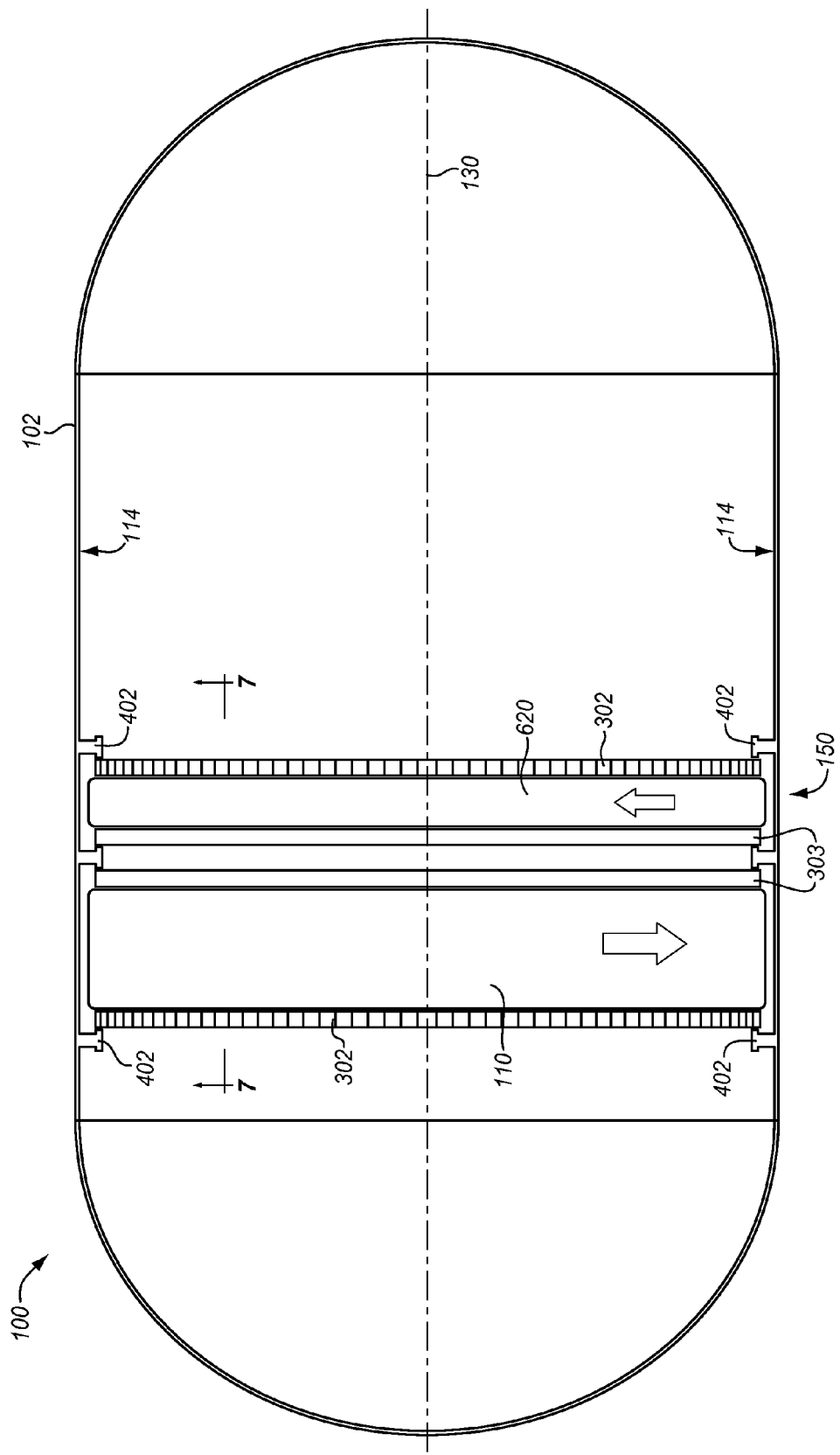
FIG. 6 illustrates a counter-weight member attached to a hull of a habitation module with support bearings in an exemplary embodiment.

FIG. 6 illustrates counter-weight member 150 attached to hull 102 with support bearings in an exemplary embodiment. Counter-weight member 150 includes a counter-weight 620 attached to hull 102 with support bearings 302-303. Counter-weight 620 comprises any mass that is able to be rotated. In the embodiment shown in FIG. 6, counter-weight 620 is a ring having a diameter less than the diameter of hull 102. Counter-weight 620 does not have to be a continuous structure as shown in FIG. 6, but may be segmented. Counter-weight 620 is driven to rotate in the opposite direction of gravity chamber 110 to negate momentum created by rotation of gravity chamber 110. Momentum is measured in mass multiplied by velocity (rotational). If it is assumed that the mass of counter-weight 620 is fixed, the counter-weight 620 is driven at a speed to compensate for the momentum created by rotation of gravity chamber 110. If the mass of gravity chamber 110 changes (e.g., a crew member enters gravity chamber 110), then the rotational speed of counter-weight 620 may be adjusted to compensate for the change in mass. The rotational speed of counter-weight 620 is therefore adjusted so that there is a net-zero momentum change due to rotation of gravity chamber 110.

Figure 7:
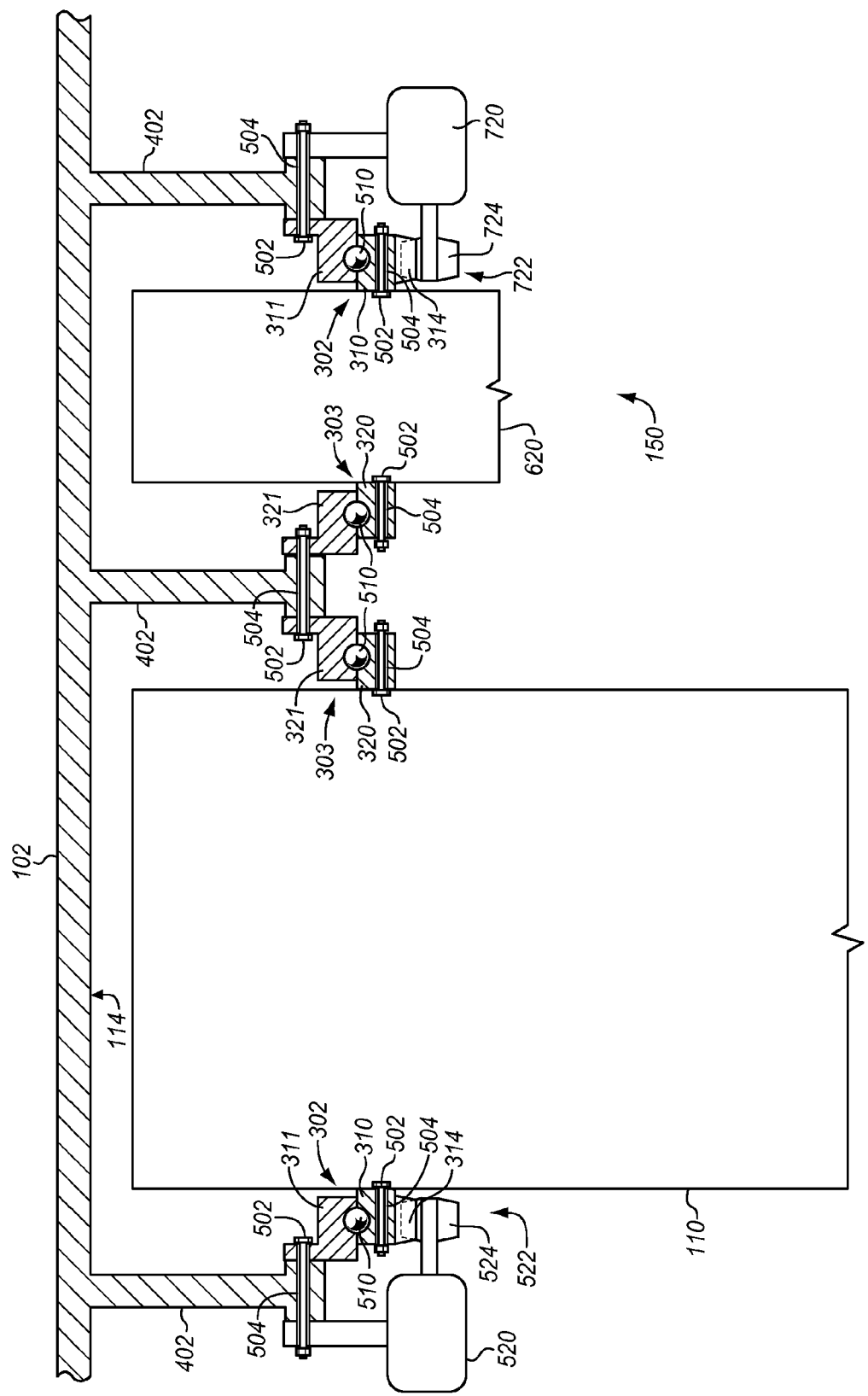
FIG. 7 illustrates attachment of a gravity chamber and a counter-weight member to a hull of a habitation module in an exemplary embodiment.

FIG. 7 illustrates attachment of gravity chamber 110 and counter-weight member 150 to hull 102 in an exemplary embodiment. FIG. 7 is a cross-section along line 7-7 of FIG. 6. The attachment of gravity chamber 110 was described in relation to FIG. 5. On the left-hand side of counter-weight member 150, inner race 320 of support bearing 303 attaches to counter-weight 620 with an attachment member 502. Outer race 321 of support bearing 303 attaches to mounting member 402 with an attachment member 502. Bushings 504 may be used at the attachment point for outer race 321 and inner race 320 to absorb noise and/or vibration at the attachment point.

On the right-hand side of counter-weight member 150, inner race 310 of support bearing 302 attaches to counter-weight 620 with an attachment member 502. Outer race 311 of support bearing 302 attaches to mounting member 402 with an attachment member 502. Bushings 504 may be used at the attachment point for outer race 311 and inner race 310 to absorb noise and/or vibration at the attachment point. A drive mechanism 720 is placed proximate or adjacent to inner race 310 of support bearing 302 to directly drive the support bearing 302 for counter-weight 620. Drive mechanism 720 is configured to spin a drive gear 722 to impart rotational movement to inner race 310. Teeth 724 on drive gear 722 mesh with teeth 314 on inner race 310 (see FIG. 3A). When drive mechanism 720 turns drive gear 522, it imparts rotational movement on counter-weight 620 about axis 130 (see FIG. 1). Drive mechanism 720 drives counter-weight 620 in an opposite direction as gravity chamber 110, and is able to adjust the speed of rotation of counter-weight to cancel any momentum created by rotation of gravity chamber 110.

Figure 8:
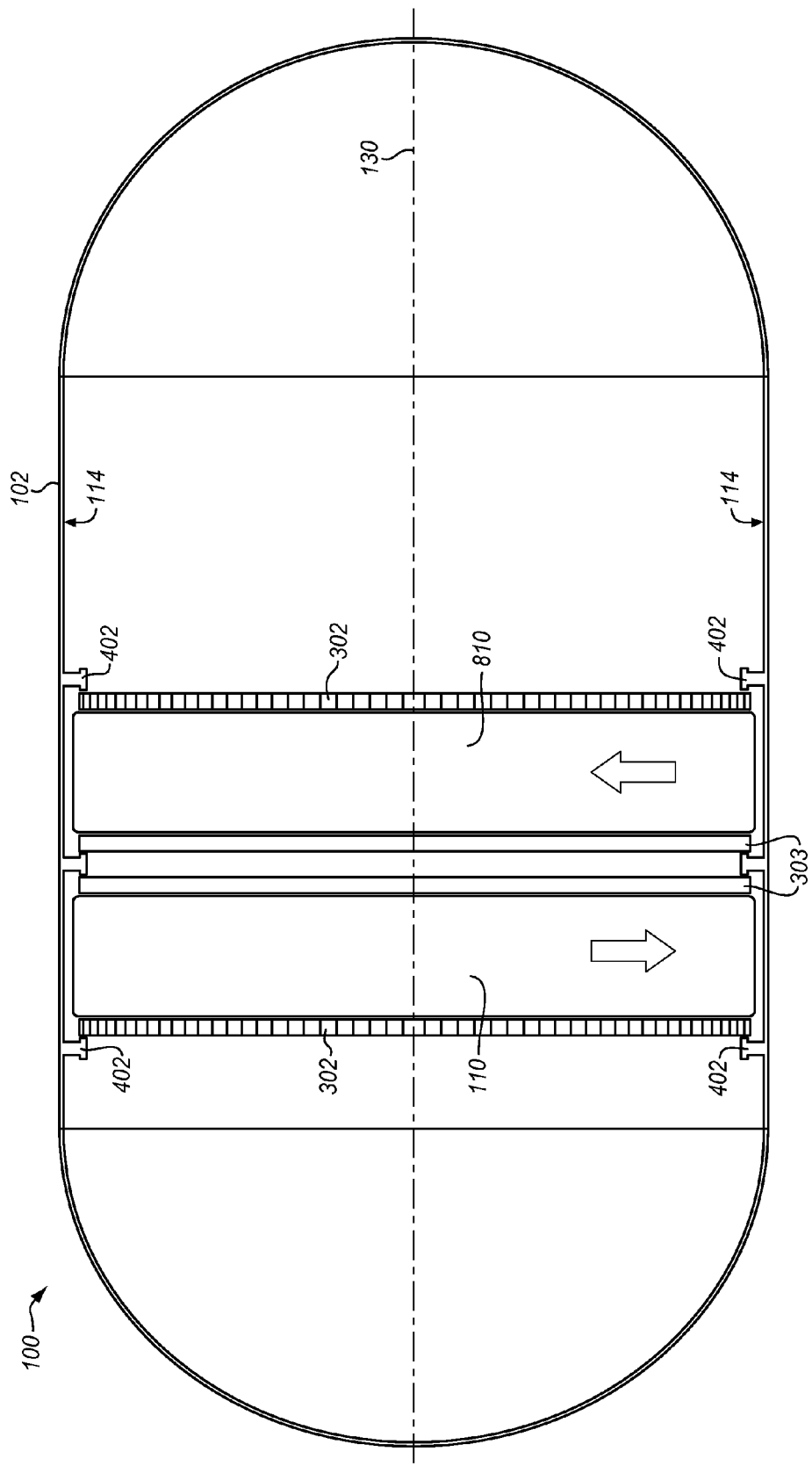
FIG. 8 illustrates a pair of gravity chambers rotating in opposition in an exemplary embodiment.

In another embodiment, counter-weight member 150 as shown in FIG. 1 may comprise a second gravity chamber that rotates in an opposite direction as gravity chamber 110. FIG. 8 illustrates a pair of gravity chambers rotating in opposition in an exemplary embodiment. In this embodiment, HAB 100 includes gravity chamber 110 as described above, and includes a second gravity chamber 810. The structure of gravity chamber 810 may be the same or similar as that described above, and may attach to hull 102 in a similar manner through support bearings. For example, gravity chamber 810 may attach to hull 102 in a similar manner as shown in FIG. 5 with support bearings 302-303, and a drive mechanism 520 (a shared or independent drive mechanism). Gravity chamber 810 is driven to rotate in a direction opposite of gravity chamber 110. Therefore, gravity chamber 810 may be used to cancel any momentum created from rotation of gravity chamber 110 (or vice-versa). The corresponding drive mechanisms for gravity chambers 110 and 810 are able to adjust the speed of rotation of gravity chambers 110 and 810 to create a net-zero momentum change on HAB 100. If independent drive mechanisms are used for gravity chambers 110 and 810, then the speed of the drive mechanism may be independently controlled. If a shared drive mechanism is used, then a gear box may be used to control the speed of gravity chambers 110 and 810 independently.

Figure 9:
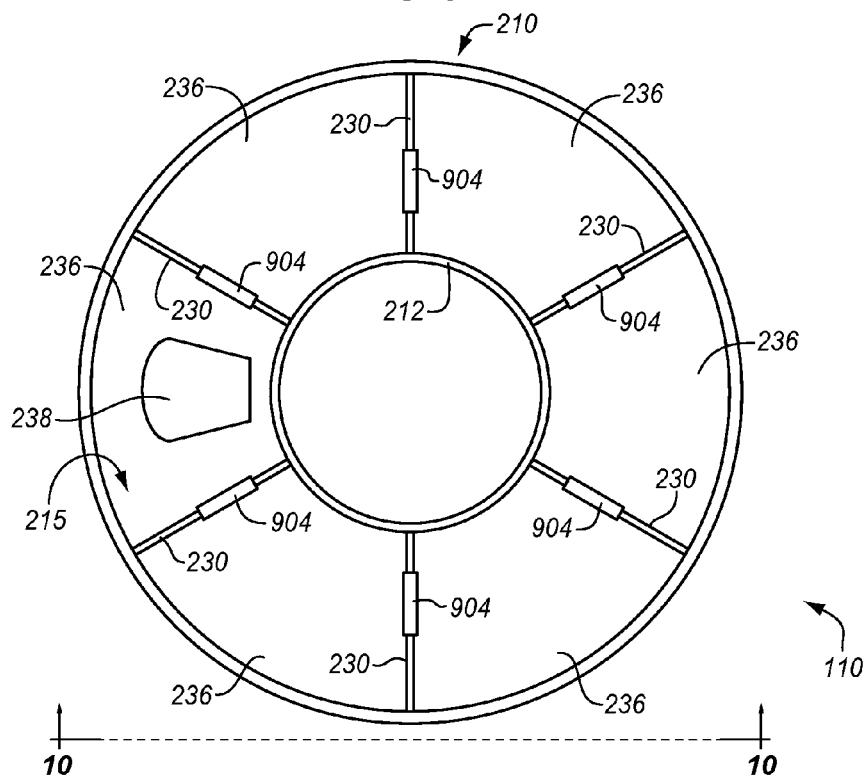
FIG. 9 is a side view of a gravity chamber in an exemplary embodiment.

FIG. 9 is a side view of gravity chamber 110 in an exemplary embodiment. The view in FIG. 9 is of side wall 215. In this embodiment, support members 230 include spring dampeners 904 that are configured to dampen noise and vibration effects of activities inside of gravity chamber 110, such as exercise activities.

Figure 10:
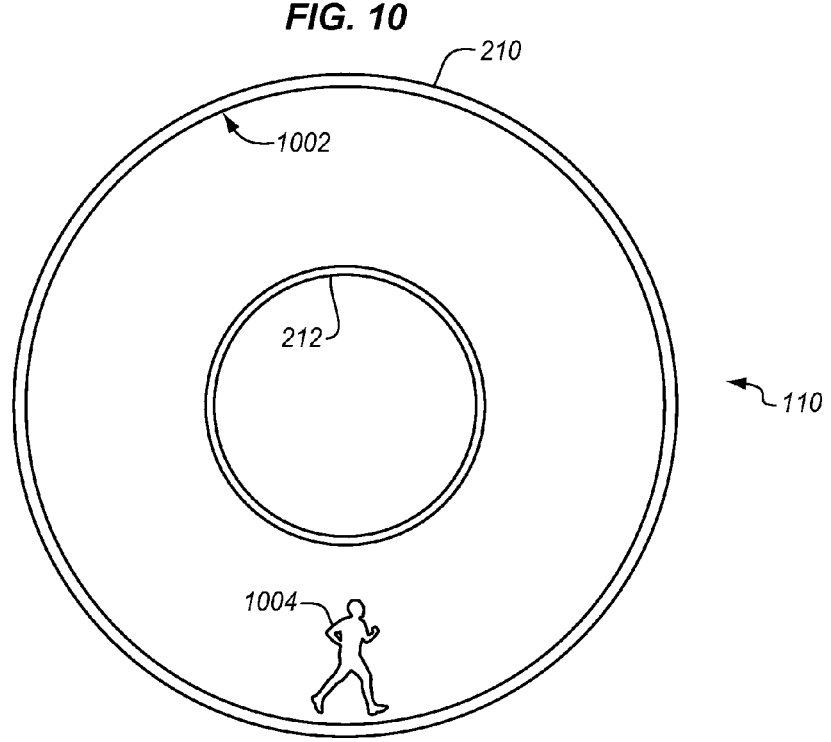
FIG. 10 illustrates an interior of a gravity chamber in an exemplary embodiment.

FIG. 10 illustrates an interior of gravity chamber 110 in an exemplary embodiment. FIG. 10 is a cross-section along line 10-10 of FIG. 9. In this embodiment, gravity chamber 110 is used for exercise activities, and therefore, may be referred to as an exercise chamber. Its interior is hollow or empty between inner cylindrical structure 212, outer cylindrical wall 210, and side walls 214-215 so that a crew member 1004 is able to walk, jog, or run within gravity chamber 110. An inner surface 1002 of outer cylindrical wall 210 may be lined with a synthetic rubber material or similar type of material for an exercise track. Thus, crew member 1004 walks, jogs, or runs on inner surface 1002 as gravity chamber 110 rotates to create an artificial gravity environment.

Figure 11:
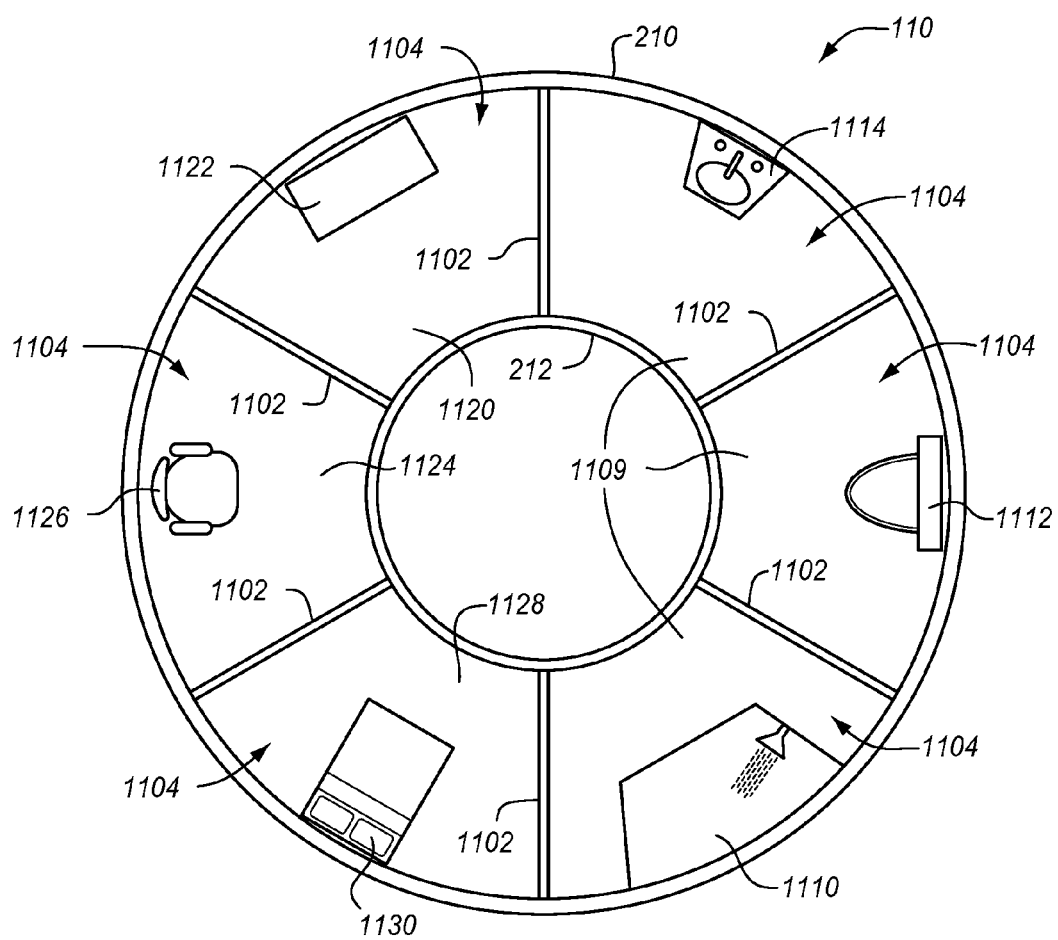
FIG. 11 illustrates an interior of a gravity chamber in an exemplary embodiment.

FIG. 11 illustrates an interior of gravity chamber 110 in another exemplary embodiment. FIG. 11 is also a cross-section along line 10-10 of FIG. 9. In this embodiment, gravity chamber 110 is compartmentalized into individual rooms. As the rooms of gravity chamber 110 may be used for rest and other activities, gravity chamber 110 may be referred to as a Rest and Activities (RAC) chamber in this embodiment. Gravity chamber 110 includes a plurality of partitions 1102 that extend radially from inner cylindrical wall 212 to outer cylindrical wall 210 to define the compartments 1104 within gravity chamber 110. Partitions 1102 may extend fully from inner cylindrical wall 212 to outer cylindrical wall 210, and from side wall 214 to side wall 215 to completely enclose compartments 1104 for privacy. Compartments 1104 may be used for a variety of purposes, such as restroom facilities 1109 having a shower 1110, a toilet 1112, and a sink 1114. A compartment 1104 may be used for office facilities 1120 having a desk 1122, chairs, cabinets, etc. A compartment 1104 may be used for lounge facilities 1124 having chairs 1126, a couch, etc. A compartment 1104 may also be used for sleeping facilities 1128 having a bed 1130.

Figure 12:
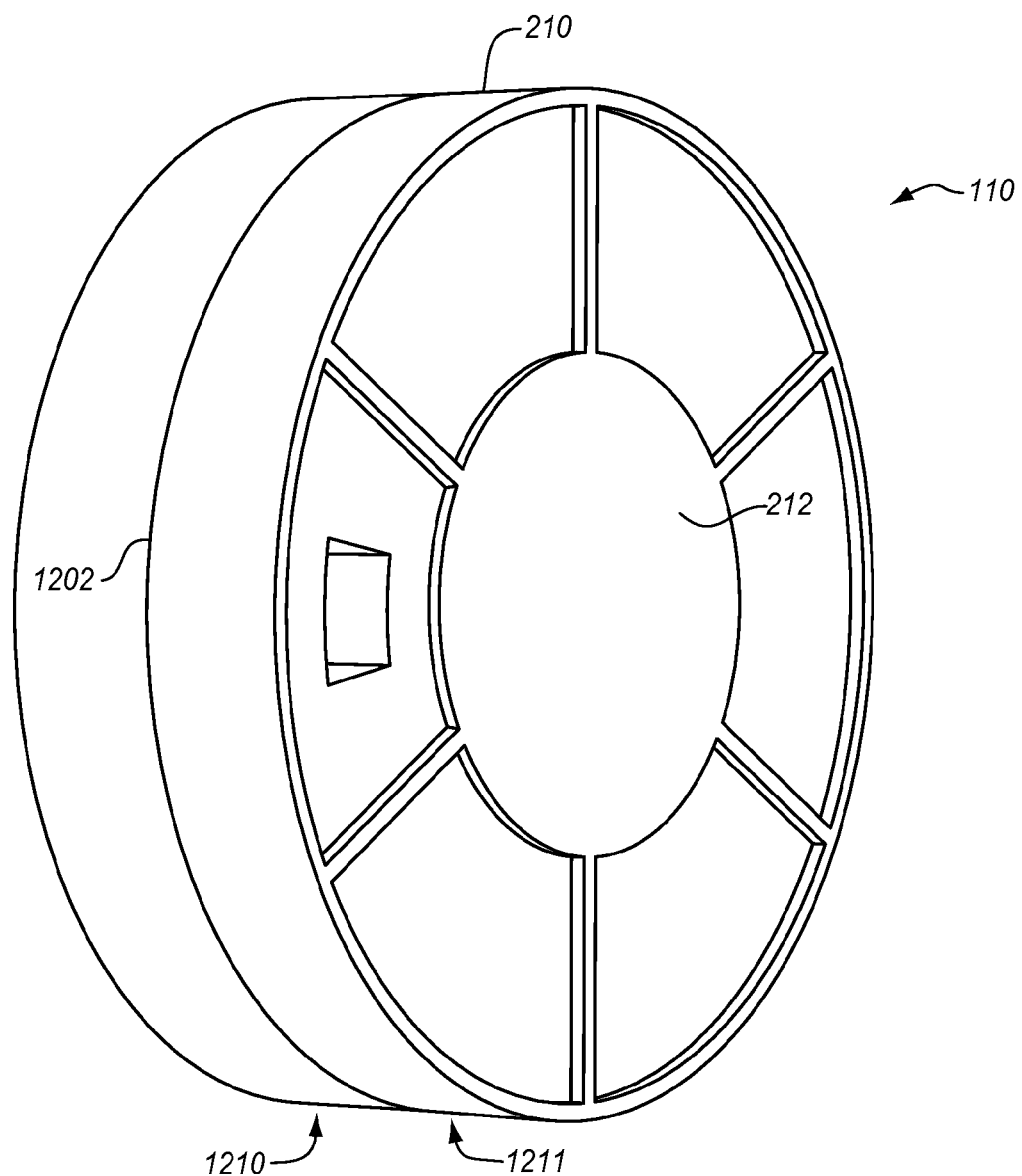
FIG. 12 illustrates a gravity chamber split into two or more annular sub-chambers in an exemplary embodiment.

FIG. 12 illustrates gravity chamber 110 split into two or more annular sub-chambers in an exemplary embodiment. In FIG. 12, gravity chamber 110 includes a divider 1202 that is orthogonal to axis 130, and divides gravity chamber 110 into annular sub-chambers 1210-1211. Sub-chamber 1210 is an exercise chamber such as shown in FIG. 10, and therefore, is hollow between inner cylindrical structure 212 and outer cylindrical wall 210. Sub-chamber 1211 is a RAC chamber, and includes a plurality of partitions that extend radially from inner cylindrical structure 212 to outer cylindrical wall 210 to define compartments within annular section 1211, such as shown in FIG. 11. Crew members are able to pass through divider 1202, such as through access openings, so that they can move freely between the RAC chamber and the exercise chamber.

Although specific embodiments were described herein, the scope is not limited to those specific embodiments. Rather, the scope is defined by the following claims and any equivalents thereof.

The invention claimed is:

1. A habitation module comprising:
a hull that defines an outer diameter of the habitation module;
a gravity chamber that includes:
an outer cylindrical wall; and
opposing side walls that connect to the outer cylindrical wall;
first support bearings for attaching the gravity chamber to the hull of the habitation module, wherein each of the first support bearings includes an outer race attached to an inner surface of the hull, and an inner race attached to the gravity chamber; and
a first drive mechanism that drives the inner race of at least one of the first support bearings to rotate the gravity chamber in a first direction about an axis to simulate a gravitational force within the gravity chamber.

2. The habitation module of claim 1 wherein the first support bearings comprise:
a pair of support bearings spaced axially along the inner surface of the hull, and attached to opposing sides of the gravity chamber.

3. The habitation module of claim 1 further comprising:
a cylindrical counter-weight member that rotates about the axis in an opposite direction than the gravity chamber.

4. The habitation module of claim 3 wherein the cylindrical counter-weight member comprises:
a counter-weight; and
second support bearings for attaching the counter-weight to the hull, wherein each of the second support bearings includes an outer race attached to the inner surface of the hull, and an inner race attached to the counter-weight.

5. The habitation module of claim 4 further comprising:
a second drive mechanism that drives the inner race of at least one of the second support bearings to rotate the counter-weight in a second direction about the axis that is opposite than the first direction.

6. The habitation module of claim 1 wherein:
a first one of the first support bearings includes teeth on the inner race;
the first drive mechanism includes a drive gear having teeth that mesh with the teeth on the inner race of the first one of the first support bearings; and
the first drive mechanism is configured to spin the drive gear to impart rotational movement to the inner race of the first one of the first support bearings.

7. The habitation module of claim 1 wherein:
the gravity chamber is hollow between the outer cylindrical wall and the side walls; and
an inner surface of the outer cylindrical wall is lined with a material for an exercise track.

8. The habitation module of claim 1 wherein:
the gravity chamber includes an inner cylindrical wall, wherein the side walls extend between the inner cylindrical wall and the outer cylindrical wall; and
the gravity chamber includes a plurality of partitions that extend radially from the inner cylindrical wall to the outer cylindrical wall to define compartments within the gravity chamber.

9. The habitation module of claim 8 wherein:
at least one of the compartments is for a restroom facility.

10. The habitation module of claim 8 wherein:
at least one of the compartments is for a sleeping facility.

11. The habitation module of claim 1 wherein:
the gravity chamber includes an inner cylindrical wall, wherein the side walls extend between the inner cylindrical wall and the outer cylindrical wall;
the gravity chamber includes a divider orthogonal to the axis that divides the gravity chamber into a first annular sub-chamber and a second annular sub-chamber;
the first annular sub-chamber is hollow between the inner cylindrical wall, the outer cylindrical wall, and the side walls for an exercise track; and
the second annular sub-chamber includes a plurality of partitions that extend radially from the inner cylindrical wall to the outer cylindrical wall between the side walls to define compartments within the second annular sub-chamber.

12. The habitation module of claim 1 wherein:
the side walls include support members that connect to the outer cylindrical wall and provide rigidity to the side walls; and
the support members include spring dampeners.

13. A habitation module comprising:
a hull that defines an outer diameter of the habitation module;
a first gravity chamber that includes a first outer cylindrical wall and first opposing side walls;
a second gravity chamber that includes a second outer cylindrical wall and second opposing side walls;
first support bearings for attaching the first gravity chamber to the hull of the habitation module, wherein each of the first support bearings includes a first outer race attached to an inner surface of the hull, and a first inner race attached to the first gravity chamber;
second support bearings for attaching the second gravity chamber to the hull, wherein each of the second support bearings includes a second outer race attached to the inner surface of the hull, and a second inner race attached to the second gravity chamber; and
at least one drive mechanism that rotates the first gravity chamber on the first support bearings in a first direction about an axis, and rotates the second gravity chamber on the second support bearings in a second direction about the axis that is opposite than the first direction.

14. The habitation module of claim 13 wherein:
the first gravity chamber is hollow between the first outer cylindrical wall and the first side walls; and
an inner surface of the first outer cylindrical wall is lined with a material for an exercise track.

15. The habitation module of claim 14 wherein:
the second gravity chamber includes an inner cylindrical wall, wherein the second side walls extend between the inner cylindrical wall and the second outer cylindrical wall; and
the second gravity chamber includes a plurality of partitions that extend radially from the inner cylindrical wall to the second outer cylindrical wall to define compartments within the second gravity chamber.

16. An apparatus comprising:
a habitation module having a hull that defines an outer diameter of the habitation module;
an annular gravity chamber that includes an outer cylindrical wall, an inner cylindrical wall, and opposing side walls that connect the outer cylindrical wall and the inner cylindrical wall;
first support bearings for attaching the gravity chamber to the hull, wherein each of the first support bearings includes a first outer race attached to an inner surface of the hull, and a first inner race attached to the gravity chamber;
a first drive mechanism that drives the first inner race of at least one of the first support bearings to rotate the gravity chamber in a first direction about an axis to simulate a gravitational force within the gravity chamber;
a counter-weight;
second support bearings for attaching the counter-weight to the hull, wherein each of the second support bearings includes a second outer race attached to the inner surface of the hull, and a second inner race attached to the counter-weight; and
a second drive mechanism that drives the second inner race of at least one of the second support bearings to rotate the counter-weight in a second direction about the axis that is opposite than the first direction.

17. The apparatus of claim 16 wherein:
a first one of the first support bearings includes teeth on the first inner race;
the first drive mechanism includes a drive gear having teeth that mesh with the teeth on the first inner race of the first one of the first support bearings; and
the first drive mechanism is configured to spin the drive gear to impart rotational movement to the first inner race of the first one of the first support bearings.

18. The apparatus of claim 16 wherein:
the gravity chamber is hollow between the inner cylindrical wall, the outer cylindrical wall, and the side walls; and
an inner surface of the outer cylindrical wall is lined with a material for an exercise track.

19. The apparatus of claim 16 wherein:
the gravity chamber includes a plurality of partitions that extend radially from the inner cylindrical wall to the outer cylindrical wall to define compartments within the gravity chamber.

20. The apparatus of claim 16 wherein:
the side walls include support members that extend from the inner cylindrical wall to the outer cylindrical wall; and
the support members include spring dampeners.

21. The apparatus of claim 16 wherein:
the second drive mechanism adjusts a rotational speed of the counter-weight to compensate for a change in mass of the gravity chamber.

22. The apparatus of claim 16 wherein:
the gravity chamber includes a divider orthogonal to the axis that divides the gravity chamber into a first annular sub-chamber and a second annular sub-chamber;
the first annular sub-chamber is hollow between the inner cylindrical wall, the outer cylindrical wall, and the side walls for an exercise track; and
the second annular sub-chamber includes a plurality of partitions that extend radially from the inner cylindrical wall to the outer cylindrical wall between the side walls to define compartments within the second annular sub-chamber.

* * * * *